(12) United States Patent
Yang

(10) Patent No.: US 9,154,793 B1
(45) Date of Patent: Oct. 6, 2015

(54) APPARATUS AND METHOD FOR PROCESSING IMAGE RECORDED IN BLACK BOX FOR VEHICLE

(71) Applicant: Hyundai Motor Company, Seoul (KR)

(72) Inventor: Seul Gi Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/482,749

(22) Filed: Sep. 10, 2014

(30) Foreign Application Priority Data

Apr. 15, 2014 (KR) ........................ 10-2014-0044840

(51) Int. Cl.
| | |
|---|---|
| *G06T 9/00* | (2006.01) |
| *H04N 19/103* | (2014.01) |
| *G07C 5/00* | (2006.01) |
| *G08G 1/0967* | (2006.01) |

(52) U.S. Cl.
CPC .............. *H04N 19/103* (2014.11); *G06T 9/00* (2013.01); *G07C 5/00* (2013.01); *G08G 1/0967* (2013.01)

(58) Field of Classification Search
CPC ...... G06T 9/00; H04N 19/103; G08G 1/0967; G07C 5/00
See application file for complete search history.

(56) References Cited

U.S. PATENT DOCUMENTS

| | | | | |
|---|---|---|---|---|
| 6,990,214 | B2 * | 1/2006 | Chujoh et al. | 382/104 |
| 8,005,145 | B2 * | 8/2011 | Lainema | 375/240.16 |
| 8,363,953 | B2 * | 1/2013 | Kameyama | 382/195 |
| 2012/0303215 | A1 * | 11/2012 | Kim et al. | 701/36 |
| 2013/0063594 | A1 | 3/2013 | Hwang et al. | |
| 2013/0250110 | A1 * | 9/2013 | Lim | 348/148 |

FOREIGN PATENT DOCUMENTS

| | | |
|---|---|---|
| JP | 2000-175162 A | 6/2000 |
| JP | 2003-284090 A | 10/2003 |
| KR | 10-1994-0025196 A | 12/1998 |
| KR | 2001-0064136 A | 7/2001 |
| KR | 2001-0069016 A | 7/2001 |
| KR | 10-2010-0003132 A | 1/2010 |
| KR | 10-2013-0029262 A | 3/2013 |
| KR | 10-2013-0099332 A | 9/2013 |

OTHER PUBLICATIONS

Korean Office Action issued in Application No. 10-2014-0044840 dated May 29, 2015.

* cited by examiner

*Primary Examiner* — Michael J Zanelli
(74) *Attorney, Agent, or Firm* — McDermott Will & Emery LLP

(57) ABSTRACT

The apparatus for processing an image recorded in a black box for a vehicle includes an information collector, a mode determiner, an encoder and a controller. The information collector is configured to collect information on a road on which a vehicle is being driven. The mode determiner is configured to determine an inter mode when the road information collected by the information collector indicates a suburban road and determine an intra mode when the road information indicates a city road. The encoder is configured to encode the image recorded in the black box. The controller is configured to control the encoder to encode the image with an encoding mode determined by the mode determiner.

13 Claims, 3 Drawing Sheets

APPARATUS AND METHOD FOR PROCESSING IMAGE RECORDED IN BLACK BOX FOR VEHICLE

CROSS-REFERENCE TO RELATED APPLICATION

This application is based on and claims the benefit of priority to Korean Patent Application No. 10-2014-0044840, filed on Apr. 15, 2014 in the Korean Intellectual Property Office, the entire content of which is incorporated herein by reference.

TECHNICAL FIELD

The present disclosure relates to an apparatus and a method for processing an image recorded in a black box for a vehicle, and more particularly, to a technology of encoding an image recorded in a black box for a vehicle with an intra mode or an inter mode according to a condition (e.g., state) of a driving road.

BACKGROUND

Generally, a process of encoding moving pictures includes processes of image preprocessing, motion estimation and compensation, transform, quantization, variable length coding, determination of an encoding mode, a transmission rate control, and the like.

Here, in the determination of the encoding mode, a motion is estimated in an integer pixel unit and then it is determined whether a macro block is encoded with the intra mode or with the inter mode.

In the intra mode, the macro block is encoded by the processes of transform, quantization, and variable length coding. In this case, the motion estimation and compensation are not required.

On the other hand, in the inter mode, the motion estimation is performed on a current block and a motion vector (MV) is obtained as a displacement from a predicted block for the current block.

Next, after the motion is compensated from the motion vector (MV), a pixel value of the predicted block is subtracted from the current block to make a residual block and then the residual block is encoded by the same method as the intra macro block. In this case, the motion vector (MV) and texture information of the residual block are transmitted to a decoder, in which the decoder may add the quantized residual block to the predicted block by the motion vector to obtain a reconstructed image for the current block.

However, the moving pictures having less motion have a lot of temporal correlation and therefore a residual signal of the residual block is very small in a current frame.

Therefore, the number of bits required to encode the residual signal and the number of bits required to encode the motion vector are smaller than the number of bits required to encode the current block. In this case, the inter mode is appropriate.

On the other hand, when region generations, which overlap or are exposed by a rapid motion or a motion of an object, and a scene change occur, it is difficult to predict the macro block.

Therefore, since the number of bits required to encode the motion vector and the residual signal is larger than the number of bits required to encode a block of an original image, encoding the original image with the intra mode is preferable in terms of encoding efficiency and subjective image quality.

The method for determining an encoding mode according to the related art needs to include a process of comparing energy of the predicted residual signal with energy of the original image to determine the intra mode or the inter mode and therefore it takes a long encoding time due to a complicated computing process.

SUMMARY

The present disclosure has been made to solve the above-mentioned problems occurring in the prior art while advantages achieved by the prior art are maintained intact.

An aspect of the present disclosure provides an apparatus and a method for processing an image recorded in a black box for a vehicle capable of shortening a determination time of an encoding mode and effectively processing (e.g., storing) an image, by determining whether the image recorded in the black box for the vehicle is encoded with an intra mode or an inter mode according to a condition (e.g., state) of a driving road.

The foregoing and other objects, features, aspects and advantages of the present disclosure will be understood and become more apparent from the following detailed description of the present disclosure. Also, it can be easily understood that the objects and advantages of the present disclosure can be realized by the units and combinations thereof recited in the claims.

One aspect of the present disclosure relates to an apparatus for processing an image recorded in a black box for a vehicle, including an information collector, a mode determiner, an encoder and a controller. The information collector is configured to collect information on a road on which a vehicle is being driven. The mode determiner is configured to determine an inter mode when the road information collected by the information collector indicates a suburban road and determine an intra mode when the road information indicates a city road. The encoder is configured to encode the image recorded in the black box. The controller is configured to control the encoder to encode the image recorded in the black box with an encoding mode determined by the mode determiner.

The information collector may collect the road information from a navigation device equipped in the vehicle.

The apparatus may include a storage, such that the controller stores the encoded image in the storage.

Another aspect of the present disclosure encompasses an apparatus for processing an image recorded in a black box for a vehicle, including an information collector, a mode determiner, an encoder and a controller. The information collector is configured to collect traffic information on a road on which a vehicle is being driven. The mode determiner is configured to determine an inter mode when the traffic information collected by the information collector indicates smooth traffic and determine an intra mode when the traffic information does not smooth traffic. The encoder is configured to encode the image recorded in the black box. The controller is configured to control the encoder to encode the image recorded in the black box with an encoding mode determined by the mode determiner.

The information collector may collect the traffic information from a navigation device equipped in the vehicle.

The apparatus may include a storage, such that the controller stores the encoded image in the storage.

Still another aspect of the present disclosure relates to a method for processing an image recorded in a black box for a vehicle, including collecting, by an information collector, information on a road on which a vehicle is being driven. A mode determiner determines an inter mode when the collected road information indicates a suburban road and determines an intra mode when the road information indicates a city road. An encoder encodes the image recorded in the black box with the determined encoding mode. The encoded image is stored in a storage.

In the collecting of the information, traffic information may be collected from a navigation device equipped in the vehicle.

Still yet another aspect of the present disclosure encompasses a method for processing an image recorded in a black box for a vehicle, including collecting, by an information collector, traffic information on a road on which a vehicle is being driven. A mode determiner determines an inter mode when the collected traffic information indicates smooth traffic and determines an intra mode when the traffic information does not indicate smooth traffic. An encoder encodes the image recorded in the black box with the determined encoding mode. The encoded image is stored in a storage.

The traffic information may indicate at least one of congestion, delay, slow moving and smoothness according to a driving speed of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The foregoing objects, features and advantages will become more apparent from the following description of exemplary embodiments of the present inventive concept with reference to accompanying drawings, which are set forth hereinafter. Accordingly, those having ordinary knowledge in the related art to which the present disclosure pertains will easily embody technical ideas or spirit of the present disclosure. Further, when technical configurations known in the related art are considered to make the contents obscure in the present disclosure, the detailed description thereof will be omitted. Hereinafter, exemplary embodiments of the present inventive concept will be described in detail with reference to the accompanying drawings.

Figure 1:
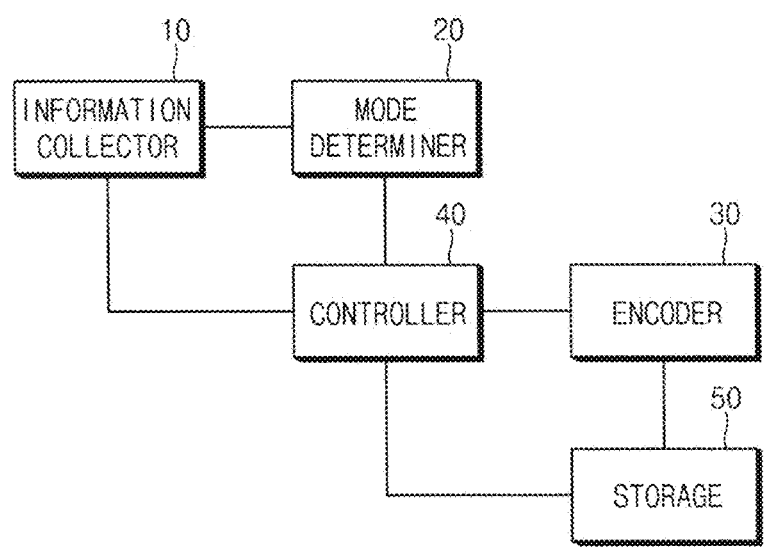
FIG. 1 is a configuration diagram of an apparatus for processing an image recorded in a black box for a vehicle according to an exemplary embodiment of the present inventive concept.

FIG. 1 is a configuration diagram of an apparatus for processing an image recorded in a black box for a vehicle according to an exemplary embodiment of the present inventive concept.

As illustrated in FIG. 1, the apparatus for processing an image recorded in a black box for a vehicle according to the exemplary embodiment of the present inventive concept may include an information collector 10, a mode determiner 20, an encoder 30, a controller 40, and a storage 50.

Describing each component, the information collector 10 may collect information on a road (e.g., suburban road, city road) on which a vehicle is being driven and traffic information (e.g., congestion, delay, slow moving, smoothness) on a road on which a vehicle is being driven.

The information collector 10 may collect the road information and the traffic information through a navigation device equipped in a vehicle, but may also collect the road information and the traffic information by being linked with a portable terminal (e.g., a smart phone, and the like) which may access a web. The traffic information may also be collected from radio broadcasting, digital multimedia broadcasting (DMB), and terrestrial broadcasting.

Here, the 'suburban road' may collectively refer to a road located at the suburbs in the administrative district and the 'city road' may collectively refer to a road located within a city in the administrative district. The suburban road may have a small number of buildings located in the vicinity of a road but the city road may have a large number of buildings located in the vicinity of a road, compared to the suburban road.

Further, in a general road, the 'congestion' may refer to the case in which a driving speed of a vehicle is within 10 km/h, the 'delay' may refer to the case in which a driving speed of a vehicle exceeds 10 km/h but is within 30 km/h, the 'slow moving' may refer to the case in which a driving speed of a vehicle exceeds 30 km/h but is within 50 km/h, and the 'smoothness' may refer to the case in which a driving speed of a vehicle exceeds 50 km/h.

Further, in an expressway, the 'congestion' may refer to the case in which a driving speed of a vehicle is within 30 km/h, the 'delay' may refer to the case in which a driving speed of a vehicle exceeds 30 km/h but is within 40 km/h, the 'slow moving' may refer to the case in which a driving speed of a vehicle exceeds 40 km/h but is within 70 km/h, and the 'smoothness' may refer to the case in which a driving speed of a vehicle exceeds 70 km/h.

A speed section of the foregoing 'congestion', 'delay', 'slow moving', and 'smoothness' may be different for each country or for each area of each country.

Navigation devices may provide the traffic information (e.g., congestion, delay, slow moving, smoothness) according to a kind of road and therefore the information collector 10 may collect the information provided by the navigation device.

Consequently, the 'congestion', 'delay', 'slow moving', and 'smoothness' may have respective speed sections which may be different according to the kind of road.

Next, the mode determiner 20 may determine the encoding mode by the following two methods.

1) In the case in which the information collected by the information collector 10 is road information: when the road information is the suburban road, the road may be determined as a lonely road and an inter mode may be determined, and when the road information is the city road, the road may be determined as a busy road and the intra mode may be determined.

2) In the case in which the information collected by the information collector 10 is the traffic information: when the traffic information is smooth, traffic volume may be determined to be small and the inter mode may be determined, and when the traffic information is not smooth, a traffic volume may be determined to be heavy and the intra mode may be determined.

Next, the encoder 30 may encode the image recorded in the black box with an encoding mode determined by the mode determiner 20.

Next, the controller 40 may control each component to perform their own functions.

In particular, the controller 40 may control the encoder 30 to encode the image recorded in the black box with the encoding mode determined by the mode determiner 20.

In addition, the apparatus for processing an image recorded in a black box for a vehicle may further include the controller 40, which stores the image recorded in the black box encoded by the encoder 30 in the storage 50.

Figure 2:
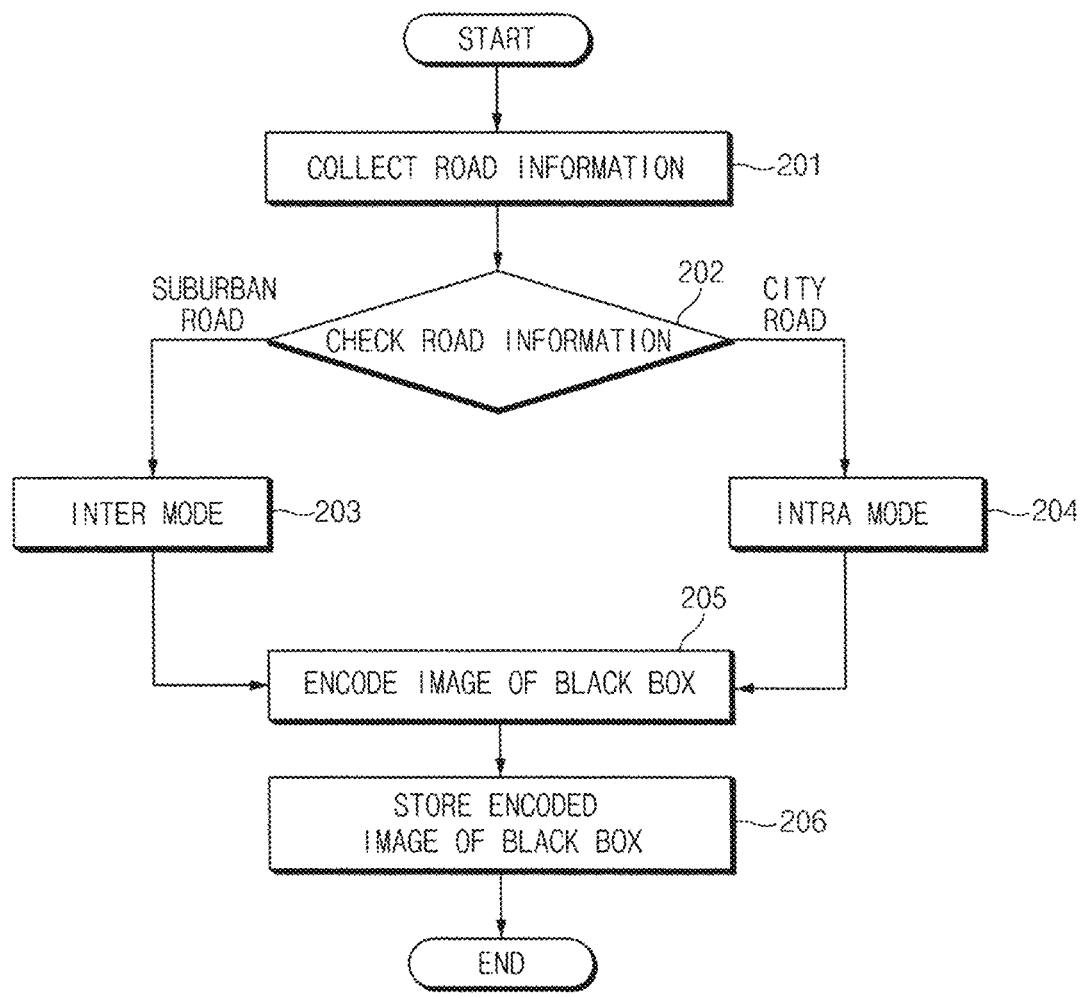
FIG. 2 is a flow chart of a method for processing an image recorded in a black box for a vehicle according to an exemplary embodiment of the present inventive concept.

FIG. 2 is a flow chart of a method for processing an image recorded in a black box for a vehicle according to an exemplary embodiment of the present inventive concept.

First, the information collector 10 may collect the information on a road on which a vehicle is being driven (201).

Next, the mode determiner 20 may check the road information collected by the information collector 10 (202).

As a result of the checking (202), if it is determined that the road is the suburban road, the inter mode may be determined (203).

As a result of the checking (202), if it is determined that the road is the city road, the intra mode may be determined (204).

Next, the encoder 30 may encode the image recorded in the black box with the encoding mode determined by the mode determiner 20 (205).

Next, the storage 50 may store the image encoded by the encoder 30 (206).

Figure 3:
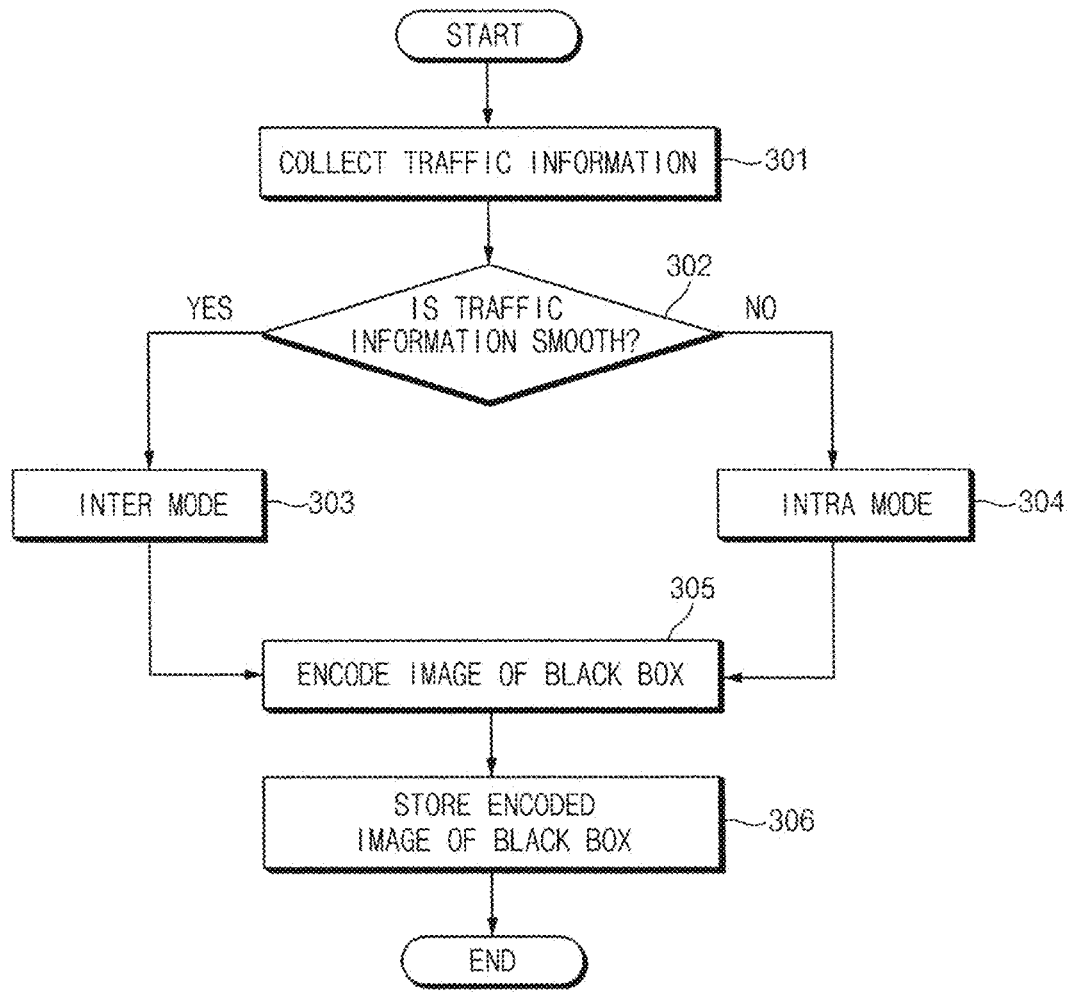
FIG. 3 is a flow chart of a method for processing an image recorded in a black box for a vehicle according to another exemplary embodiment of the present inventive concept.

FIG. 3 is a flow chart of a method for processing an image recorded in a black box for a vehicle according to another exemplary embodiment of the present inventive concept.

First, the information collector 10 may collect the traffic information (e.g., congestion, delay, slow moving, smoothness) on the road on which the vehicle is being driven (301).

Next, the mode determiner 20 may check whether the traffic information collected by the information collector 10 is smooth (302).

As a result of the checking (302), if it is determined that the traffic information is smooth, the inter mode may be determined (303).

As a result of the checking (302), if it is determined that the traffic information is not smooth, the intra mode may be determined (304).

Next, the encoder 30 may encode the image recorded in the black box with the encoding mode determined by the mode determiner 20 (305).

Next, the storage 50 may store the image encoded by the encoder 30 (306).

Meanwhile, the method according to the exemplary embodiment of the present inventive concept as described above may be prepared by a computer program. Codes and code segments configuring the computer program may be easily deduced by computer programmers in the art. In addition, the computer program may be stored in computer readable recording media (e.g., information storage media) and may be read and executed by computers, thereby implementing the methods according to the present disclosure. Further, the recording media may include any type of recording media which may be read by a computer.

As described above, according to the exemplary embodiments of the present inventive concept, it is possible to shorten the determination time of the encoding mode and efficiently process (e.g., store) the image, by determining whether the image recorded in the black box for the vehicle is encoded with the intra mode or the inter mode according to the condition (e.g., state) of the driving road.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. An apparatus for processing an image recorded in a black box for a vehicle, the apparatus comprising:
    an information collector configured to collect information on a road on which a vehicle is being driven;
    a mode determiner configured to determine an inter mode when the road information collected by the information collector indicates a suburban road and determine an intra mode when the road information indicates a city road;
    an encoder configured to encode the image recorded in the black box; and
    a controller configured to control the encoder to encode the image recorded in the black box with an encoding mode determined by the mode determiner.

2. The apparatus according to claim 1, wherein the information collector collects the road information from a navigation device equipped in the vehicle.

3. The apparatus according to claim 1, further comprising:
    a storage,
    wherein the controller stores the encoded image in the storage.

4. An apparatus for processing an image recorded in a black box for a vehicle, comprising:
    information collector configured to collect traffic information on a road on which a vehicle is being driven;
    a mode determiner configured to determine an inter mode when the traffic information collected by the information collector indicates smooth traffic and determine an intra mode when the traffic information does not indicate smooth traffic;
    an encoder configured to encode the image recorded in the black box; and
    a controller configured to control the encoder to encode the image recorded in the black box with an encoding mode determined by the mode determiner.

5. The apparatus according to claim 4, wherein the information collector collects the traffic information from a navigation device equipped in the vehicle.

6. The apparatus according to claim 4, further comprising:
    a storage,
    wherein the controller stores the encoded image in the storage.

7. The apparatus according to claim 4, wherein the traffic information indicates at least one of congestion, delay, slow moving and smoothness according to a driving speed of the vehicle.

8. A method for processing an image recorded in a black box for a vehicle, comprising:
    collecting, by an information collector, information on a road on which a vehicle is being driven;
    determining, by a mode determiner, an inter mode when the collected road information indicates a suburban road and determining an intra mode when the collected road information indicates a city road;
    encoding, by an encoder, the image recorded in the black box with the determined encoding mode; and
    storing the encoded image in a storage.

9. The method according to claim 8, wherein the collecting of the information includes collecting traffic information from a navigation device equipped in the vehicle.

10. The method according to claim 9, wherein the traffic information indicates at least one of congestion, delay, slow moving and smoothness according to a driving speed of the vehicle.

11. A method for processing an image recorded in a black box for a vehicle, comprising:
- collecting, by an information collector, traffic information on a road on which a vehicle is being driven;
- determining, by a mode determiner, an inter mode when the collected traffic information indicates smooth traffic and determining an intra mode when the traffic information does not indicates smooth traffic;
- encoding, by an encoder, the image recorded in the black box with the determined encoding mode; and
- storing the encoded image in a storage.

12. The method according to claim 11, wherein the collecting of the information includes collecting the traffic information from a navigation device equipped in the vehicle.

13. The method according to claim 11, wherein the traffic information indicates at least one of congestion, delay, slow moving and smoothness according to driving a speed of the vehicle.

* * * * *